United States Patent [19]

Downard et al.

[11] Patent Number: 5,108,075
[45] Date of Patent: Apr. 28, 1992

[54] ORIFICE VALVE ASSEMBLY

[75] Inventors: Ronald L. Downard, Elkton; Larry J. Epps, Nova; Robert C. Kays, East Liverpool, all of Ohio

[73] Assignee: ESM II Inc., Niagara Falls, N.Y.

[21] Appl. No.: 692,265

[22] Filed: Apr. 26, 1991

[51] Int. Cl.$^5$ .............................................. F16K 5/10
[52] U.S. Cl. .................................. 251/209; 251/120; 251/312
[58] Field of Search ................... 251/209, 312, 120

[56] References Cited

U.S. PATENT DOCUMENTS

| | | | |
|---|---|---|---|
| 2,067,346 | 1/1937 | Rovinsky | 251/209 X |
| 4,262,689 | 4/1981 | Rodder | 251/209 X |
| 4,934,604 | 6/1990 | Oskamp | 251/209 X |

FOREIGN PATENT DOCUMENTS

| | | |
|---|---|---|
| 3641639 | 6/1988 | Fed. Rep. of Germany . |
| 2122309 | 1/1984 | United Kingdom . |

Primary Examiner—Arnold Rosenthal
Attorney, Agent, or Firm—John G. Thompson

[57] ABSTRACT

An orifice valve assembly which may be utilized to control the flow of a fluent material, such as powdered magnesium, propelled by gas under pressure, the valve controlling the flow in a linear manner.

The valve includes a valve body having first and second adjacent concentric bores, the first bore being of a larger diameter than the second bore, and a cross-bore intersecting the first bore, the cross-bore having a cylindrical portion which intersects the first bore and frusto-conical inlet and outlet portions to either side of the cylindrical portion. A rotatable valve body is mounted within the first and second bores, the valve body having cylindrical first and second portions of a diameter just slightly less than the first and second bores of the cylindrical body, the first bore being provided with a circumferential groove which has a rounded bottom surface of a radius equal to the radius of the intersecting cylindrical portion, and which is of a crescent-shaped cross-section when viewed in a section transverse to the axis of the cylindrical body. Means are provided to rotate the valve core within the valve body.

8 Claims, 3 Drawing Sheets

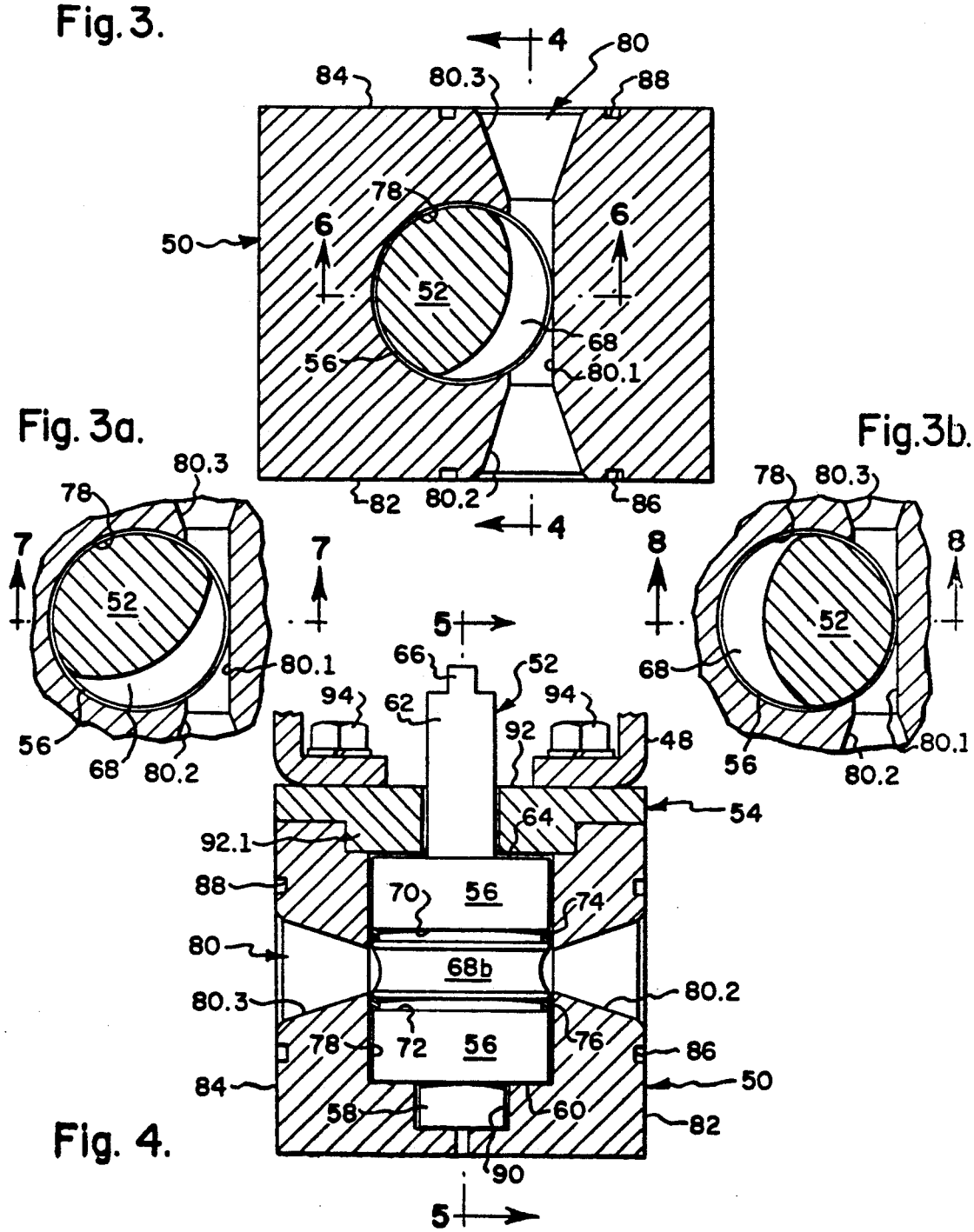

ORIFICE VALVE ASSEMBLY

TECHNICAL FIELD

The present invention relates generally to valves and more particularly to a valve which may be utilized to control the flow of a fluent material, such as powdered magnesium, propelled by gas under pressure, the valve controlling the flow in a linear manner.

BACKGROUND OF THE INVENTION

In order to run a successful basic oxygen furnace—continuous slab caster combination there is a need for low sulfur blast furnace hot metal. It has been found that by introducing magnesium into a ladle that the sulfur content of the hot metal may be reduced. This is typically done by mixing finely powdered magnesium with small quantities of powdered lime, and then entraining the mix into a stream of an inert gas such as nitrogen. During injection it is desirable to vary the flow of the powdered magnesium being injected from a no-flow to a 100-percent flow condition and back to a zero-flow condition in a linear manner and in such a manner that minimal turbulence will be created within the ladle it has been found that precise flow control of the magnesium will reduce the turbulence.

OBJECTS AND SUMMARY OF THE INVENTION

It is an object of the present invention to provide an orifice valve assembly for use with the control of the flow of fluent materials wherein the flow of fluent materials can be progressively varied in a linear manner without pneumatic disturbances.

The flow of magnesium is controlled by the orifice valve of the present invention by having the cross-sectional diameters of the passageways through which the magnesium flow progressively narrow down and widen out without sharp edges or "sacks"

The foregoing object and other objects and advantages of the present invention will be more clearly understood from a consideration of the following detailed description taken in conjunction with the accompanyinq drawings in which a preferred form of this invention is illustrated.

BRIEF DESCRIPTION OF THE DRAWINGS

FIG. 3 is a section taken generally along the line 3—3 in FIG. 2.

FIGS. 3a and 3b are partial sectional views of the structure shown in FIG. 3 showing the valve core rotated to differing positions within the valve body.

FIG. 4 is a sectional view taken generally along the line 4—4 in FIG. 3.

DETAILED DESCRIPTION

Figure 1:
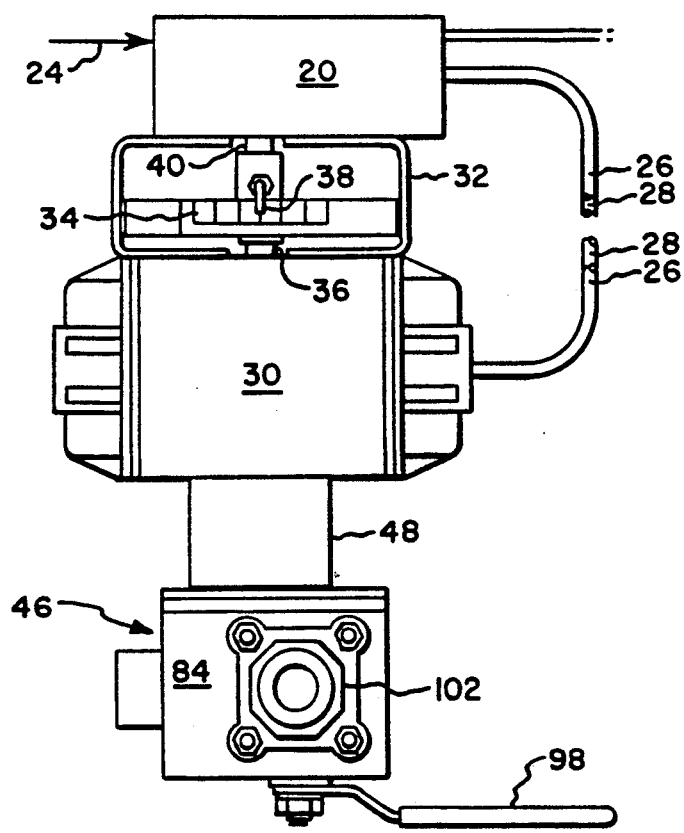
FIG. 1 is a side view of the orifice valve assembly of this invention associated with a valve operating mechanism.
Figure 2:
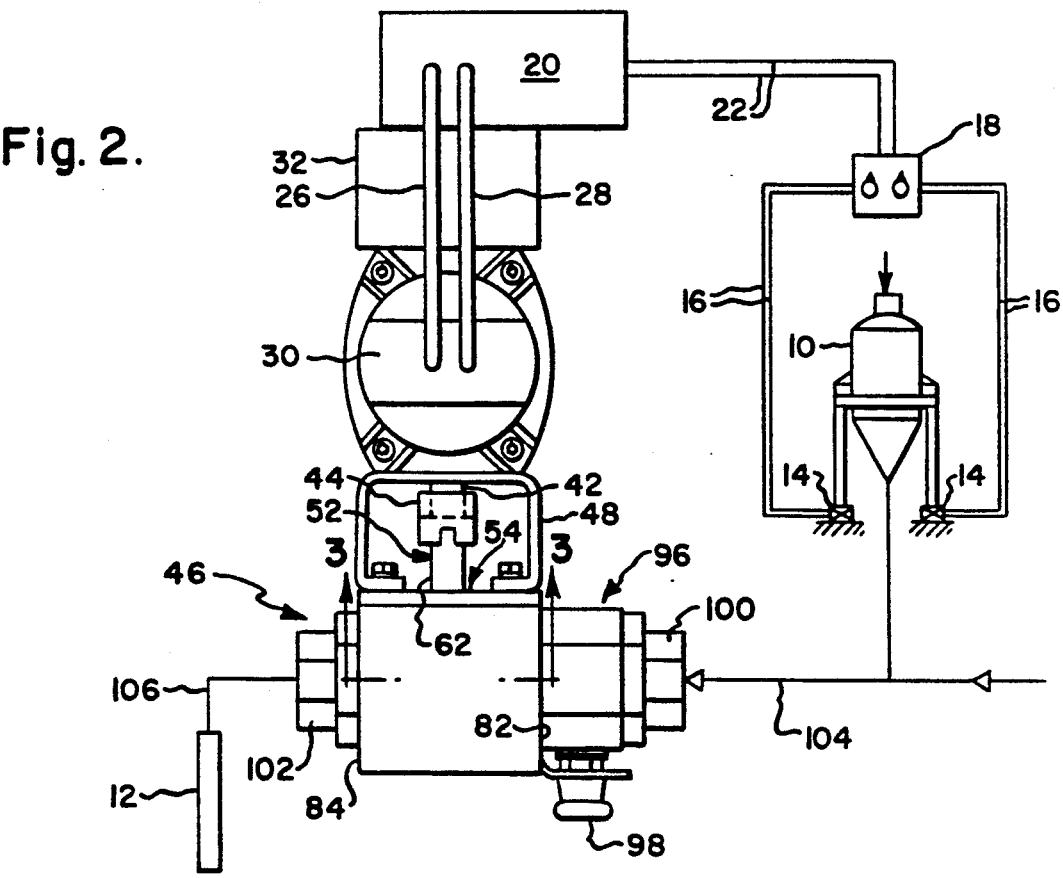
FIG. 2 is a front view of the assembly shown in FIG. 1 and further illustrating schematically the manner in which it will be used.

First, with reference to FIG. 2, the orifice valve assembly of this invention may be used to control the flow of powdered magnesium (which may be mixed with calcium oxide) from a hopper or tank 10 to a lance 12 mounted within a hot metal ladle (not shown). The tank 10 is mounted upon load cells 14 which are capable of sensing the weight of the tank 10 and which may transmit a proportionate signal via electrical lines 16 to a programmable electronic signal processor 18. The processor 18 is in turn connected with a valve positioner 20 by means of electrical lines 22. A source of air under pressure, indicated by arrow 24 (FIG. 1), is connected to the valve positoiner. The valve positioner 20 will, in response to the signals received from the programmable electronic signal processor, initiate a flow of air through air lines 26 and 28 to a pneumatic actuator 30. The valve positioner may be of a conventional construction and one typical example is the Worcester PM15 electro-pneumatic positioner manufactured by Worcester Controls The pneumatic actuator 30 is also of a conventional construction manufactured by Worcester Controls. It has a rotary member mounted therein which can be rotated in accordance with the signals received through air lines 26 and 28.

The valve positioner is mounted upon a bracket 32 best shown in FIG. 1, the bracket being of generally rectangular construction having one side mounted upon the pneumatic actuator 30 and having the valve positioner control 20 mounted on its other side. The bracket is open to, the sides and an indicia strip 34 is mounted therein, ends of the strip being secured to right-side and left-side of the bracket 32. The indicia strip is provided with suitable markings to indicate the rotational position of an actuator member, and to this end a shaft 36 extends outwardly of the pneumatic actuator 30, the shaft 36 carrying an indicator arm 38. The valve positioner 20 is provided with a rotary member (not shown) which has an outwardly extending feedback shaft 40 coupled thereto, the feedback shaft 40 in turn being coupled to the indicator shaft 36 to provide suitable feedback information to the valve positioner.

The rotatable member within the actuator 30, has a control shaft 42 (FIG. 2) which is co-axial with the indicator shaft 36 but which extends outwardly of the actuator in a direction opposite of the indicator shaft The control shaft 40 is provided with a coupler 44.

The orifice valve assembly of the present invention is indicated generally at 46 and is coupled to the coupler 44 in a manner which will be brought out below The valve assembly 46 is rigidly mounted on the pneumatic actuator 30 by a generally C-shaped bracket 48, the details of which are not material to the present invention. As can best be seen from FIG. 5, the valve assembly includes, as its principal components, a valve body indicated generally at 50, a rotatable valve core 52 indicated generally at 52, and retainer means 54 for retaining the rotatable valve core indicated at 52 within the the valve body indicated generally at 50.

Figure 5:
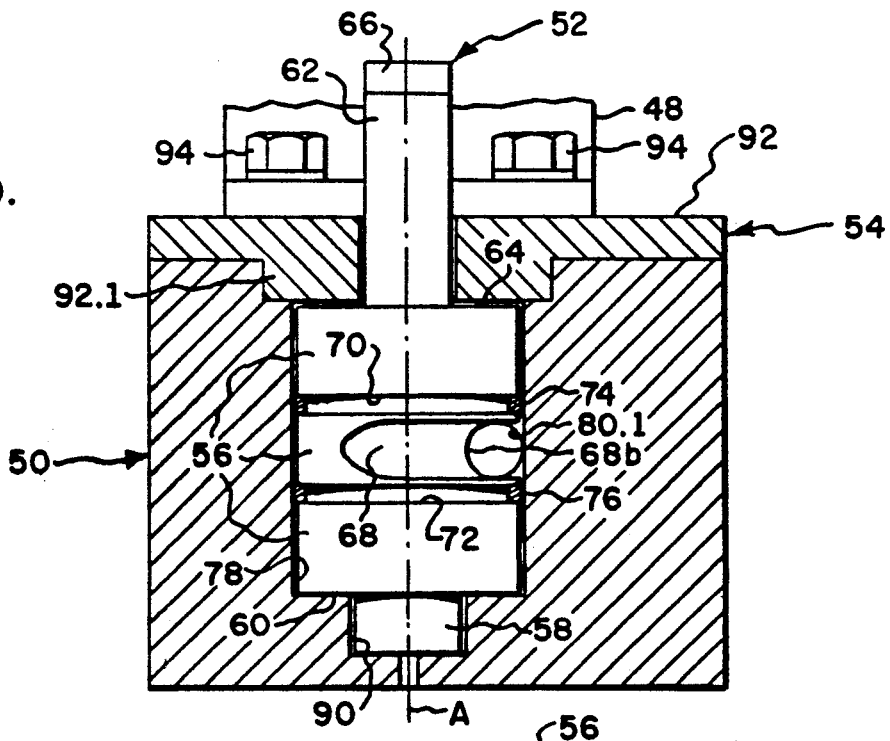
FIG. 5 is a sectional view taken generally along the line 5—5 in FIG. 4.
Figure 6:
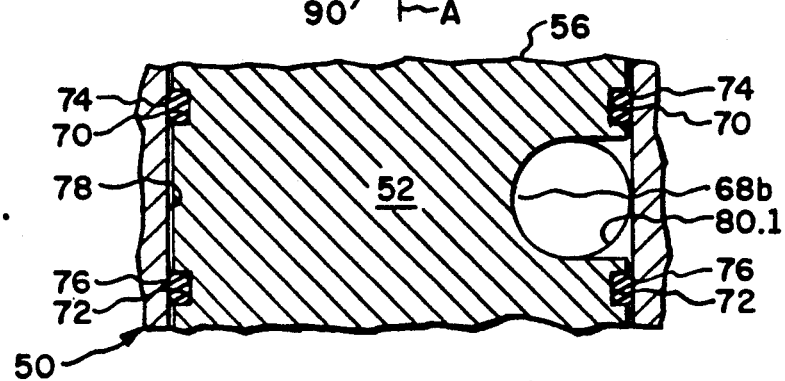
FIG. 6 is a sectional view taken generally along the line 6—6 in FIG. 3 but showing the valve core rotated to its most open position.
Figure 7:
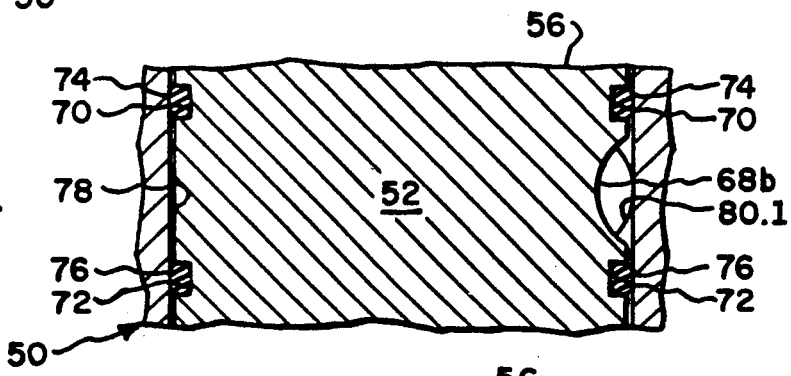
FIGS. 7 and 8 are sectional views taken generally along the lines 7—7 in FIG. 3a and 8—8 in FIG. 3b, respectively, showing the valve core intermediate and closed positions, respectively

The valve core includes, as its principal portions, a first cylindrical portion 56, a second cylindrical portion 58 which is co-axial with the first cylindrical portion and is adjacent to one side 60 of the first cylindrical portion, and a valve stem 62 which extends away from the other side 66 of the first cylindrical portion 56. The valve stem 62 is provided with a tang 66 which in the normal assembled position is coupled with the coupler 44. The first cylindrical portion has a circumferentially extending groove 68 which has a rounded bottom surface 68b. Thus, it can be seen that the groove has a C-shaped cross-section when taken in a radial plane which extends through the axis of the first cylindrical portion as shown in FIGS. 5 through 7. As can also be seen best from FIG. 3, the groove has a crescent-shaped cross-section when viewed in an axial plane which is perpendicular to the axis of the first cylindrical portion 56. Disposed to either side of the annular groove 68 are circumferential annular grooves 70, 72 These grooves are designed to receive 0-rings 74 and 78, respectively.

The valve body 50 is provided with a first cylindrical bore 78 for the reception of the first cylindrical portion 56 of the valve core 52 It can be seen that the first cylindrical portion 52 of the valve core 56 is of a diameter just slightly less than the diameter of the first cylindrical bore 78. Intersecting the first cylindrical bore is a second bore 80 which extends through the valve body for passage of fluent materials. The second bore 80 has a cylindrical portion 80.1 and frusto-conical inlet and outlet portions 80.2 and 80.3 to either side of the cylindrical portion 80.1. The inlet and outlet portions terminates in a planar surface 82 or 84, respectively, the surfaces being provided with respective annular grooves 86 and 88 for the reception of annular 0-ring face seals (not shown) As can be seen from the various figures, the cylindrical portion 80.1 intersects the first cylindrical bore 78 of the valve body between the ends of the valve body and at right angles thereto, the cylindrical portion 80.1 of the second bore being of a diameter approximately one-third the diameter of the first bore 78 and intersecting the periphery of the first cylindrical bore in such a manner that the surface of the cylindrical portion 80.1 which is spaced furthest away from the axis of the first cylindrical bore (shown by broken line A in FIG. 5) is tangent to the surface of the first cylindrical bore this feature best being shown in FIGS. 3, 3a, and 3b. As can best be seen from FIG. 6, the radius of the first cylindrical portion 80.1 is of the same radius as the bottom portion 68b of the groove. The valve body is further provided with a third cylindrical bore 90 which is co-axial with the first cylindrical bore 78. As can be seen from FIG. 4, the diameter of the second cylindrical portion 58 of the valve core 52 is just slightly less than the diameter of the third cylindrical bore 90 so that the third cylindrical bore can act as a bearing for the second cylindrical portion 58.

As can be seen from FIGS. 4 and 5, the retainer means retains the valve core within the valve body, the retainer means including a plate member 92 and fasteners 94 The plate member 92 is provided with a suitable aperture for the reception of the valve stem 62. The plate member is held in place by the fasteners 94, which fasteners are also used to secure the orifice valve assembly 48 to the bracket 48 While the plate member is illustrated with an annular boss 92.1 received within a corresponding annular bore (no number) in the valve body, it should be obvious that the plate member 92 need not be provided with such a boss.

A manual orifice valve assembly, indicated at 96 in FIG. 2, is held adjacent surface 82, the orifice valve 96 being operated in a suitable manner through lever 98. As illustrated, an inlet fitting 100 is secured to the manual valve 96 and an outlet fitting 102 is secured to the other face 84 of the valve body 50. A suitable inlet fluent line 104 will extend from the hopper or tank 10 to the inlet fitting 100, and similarly an outlet fluent line 106 will extend from the outlet fitting 102 to the lance 12.

Figure 8:
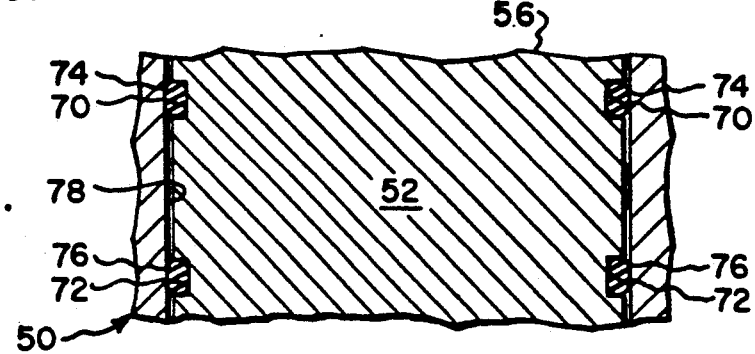

It should seen from an inspection of FIGS. 6, 7, and 8 that, as the valve core 52 is rotated within the valve body 50 from the full open position shown in FIG. 6 to a closed position shown in FIG. 8, the effective cross-sectional diameter of the passageway for fluent material will be progressively decreased by shifting the bottom 68b of the groove into the flow of the material. This provides more favorable flow characteristics than if a knife-edge were moved across a passageway for fluent materials. Thus, the valve of the present design operates in a very smooth way which does not distrub the pneumatic flow of the material to any degree as there is no interruptinq edge within the valve, and changes in the cross-sectional area of the passageway 80 are always progressive in all positions of the valve core. One of the reasons there is little disruption of the pneumatic flow of the material as the orifice valve varied is that the shape of the orifice at the narrowest point is smooth and rounded in all portions. Another reason is that the expansion after the narrowest point is achieved over a rounded body rather than a sharp recess after an edge as if a knife-edge were used. It can thus be seen that the orifice valve assembly of this invention controls the injection rate in a stable manner.

While a preferred form of the present invention has been shown and described above, it should be understood that applicant does not intend to be limited to the precise form shown and described above.

What is claimed is:

1. An orifice valve assembly for use with injection of powdered magnesium into molten steel for desulferization; said orifice valve assembly comprising:
    a valve body having
    a first cylindrical bore, and
    a second bore through which fluent materials may flow through the valve body, the second bore having a cylindrical portion which intersects the first cylindrical bore between the ends of the first cylindrical bore and at right angles thereto, and the cylindrical portion of the second bore being of a diameter less than the diameter of the first cylindrical bore;
    a valve core rotatable within the first cylindrical bore, the valve core having
    a first cylindrical portion having a diameter which is just slightly less than the diameter of the first cylindrical bore, the cylindrical portion having a circumferentially extending groove having a rounded bottom surface, the groove extending partially about the cylindrical portion core and having a "C" shaped cross-section when taken in a radial plane and a crescent shaped cross-section when taken in an axial plane; and mean to rotate the valve core within the valve body.

2. The orifice valve assembly as set forth in claim 1 wherein the valve body is further characterized by the provision of a third cylindrical bore coaxial with and adjacent to one side of the first cylindrical bore, and wherein the valve core is provided with a second cylindrical portion coaxial with and adjacent to one side of the first cylindrical portion, the second cylindrical portion having a diameter just slightly less than the diameter of the third cylindrical bore and being received therein to act as a bearing support for said valve core.

3. The orifice valve assembly as set forth in claim 2 wherein the valve core is further provided with a valve stem extending away from the other side of the first cylindrical portion in a direction opposite than the second cylindrical portion, and wherein the orifice valve assembly is further characterized by retainer means for retaining the valve core within the valve body, said retainer means bearing against the other side of the first cylindrical portion of the valve core, the valve stem passing through the retainer means.

4. The orifice valve assembly as set forth in claim 1 wherein the periphery of the cylindrical portion of the second bore of the valve body intersects the periphery of the first cylindrical bore.

5. The orifice valve assembly as set forth in claim 4 wherein the diameter of the cylindrical portion of the second bore is approximately one third the diameter of the first cylindrical bore.

6. The orifice valve assembly as set forth in claim 1 wherein the first cylindrical portion of the valve core is provided with circumferential annular cylindrical grooves to either side of the peripheral groove, and further characterized by the provision of O-rings received within said circumferential annular cylindrical grooves.

7. The orifice valve assembly as set forth in claim 1 wherein the radius of the cylindrical portion of the second bore is substantially equal to the radius of the C-shaped cross-section of the peripheral groove.

8. The orifice valve assembly as set forth in claim 1 wherein the second bore further includes frusto-conical portions to either side of the cylindrical portion.

* * * * *